April 22, 1952     J. R. McKNIGHT, JR     2,593,473

ELECTRICALLY OPERATED LIQUID LEVEL INDICATOR

Filed Feb. 6, 1948

INVENTOR
JOHN ROWLAND McKNIGHT, JR.

BY *M. Hayes*

ATTORNEY

Patented Apr. 22, 1952

2,593,473

UNITED STATES PATENT OFFICE 2,593,473

ELECTRICALLY OPERATED LIQUID LEVEL INDICATOR

John Rowland McKnight, Jr., United States Navy, San Diego, Calif.

Application February 6, 1948, Serial No. 6,573

8 Claims. (Cl. 73—290)

(Granted under the act of March 3, 1883, as amended April 30, 1928; 370 O. G. 757)

This invention relates in general to indicators and more particularly to electrically operated liquid level indicators.

The stowage of liquids such as oil, gasoline, and the like, in tanks, presents the problem of providing adequate means for indicating the quantity of liquid in the tank. Liquids are stored under a variety of conditions, each in itself presenting its own indicating problem. For example, in submarine fuel tanks, to maintain an even keel and facilitate maneuverability as fuel oil is consumed, salt water is pumped into the tanks to keep them full at all times. The water and oil are sufficiently different densities, that they do not mix. Since knowledge of the available fuel supply is vital, it is desirable that an accurate method be provided for indicating at all times the proportionate amount of oil and water in the tanks. Several methods of indication exist, but they are either inadequate or are not capable of remote indication. A gauge glass, for example, will indicate the line of division between the two liquids, but there is no provision for transmitting the information to a remote point. Test cocks inserted in the wall of the tank at spaced intervals provide a positive means of indication, but again there is no means of transmitting the indication to the control room. Float systems, too, have been designed which actuate bellows which transmit a pressure through uniform diameter tubes to a remote indicator. In order that such a system be able to indicate accurately the proportionate quantities of the two liquids, the float must be weighted very accurately. It is also well known that to maintain a constant diameter throughout the length of a small tube is extremely difficult.

The problem of indicating the level of a single liquid in a closed tank under a gaseous pressure or the level of a single liquid in an open tank under atmospheric pressure is somewhat simpler, but there still exists the problem of remote indication. Here again, the gauge glass, test cocks, and floats with rod indicators provide a positive, but local indication. A pneumatic system of indication has also been used in this application, wherein the pressure head of the liquid in the tank is balanced by air pressure inside a bell located at the bottom of the tank, this air pressure being measured at a remote point by a mercury manometer. The manometer is calibrated in gallons of liquid and presents an accurate indication. Extreme care must be exercised, however, in using this system. By improper manipulation of air valves it is easily possible to blow the mercury from the manometer, or admit mercury to the fuel tank. Since this system does not give a continuous indication, readings must be taken periodically. It is apparent from the above discussion that existing indicating methods are inadequate. It is accordingly the primary object of the present invention to overcome the disadvantage of existing liquid level indicating methods.

A further object of the present invention is to provide apparatus for remotely and continuously indicating the proportionate quantities of two liquids of different densities which completely fill a tank.

It is further an object of the present invention to provide apparatus for remotely and continuously indicating the level of a single liquid under gaseous pressure in a closed tank.

It is still another object of the present invention to provide apparatus for remotely and continuously indicating the level of a single liquid in an open tank subjected to atmospheric pressure.

These and other objects will be apparent from the detailed description when taken with the accompanying drawings in which.

Figure 1:
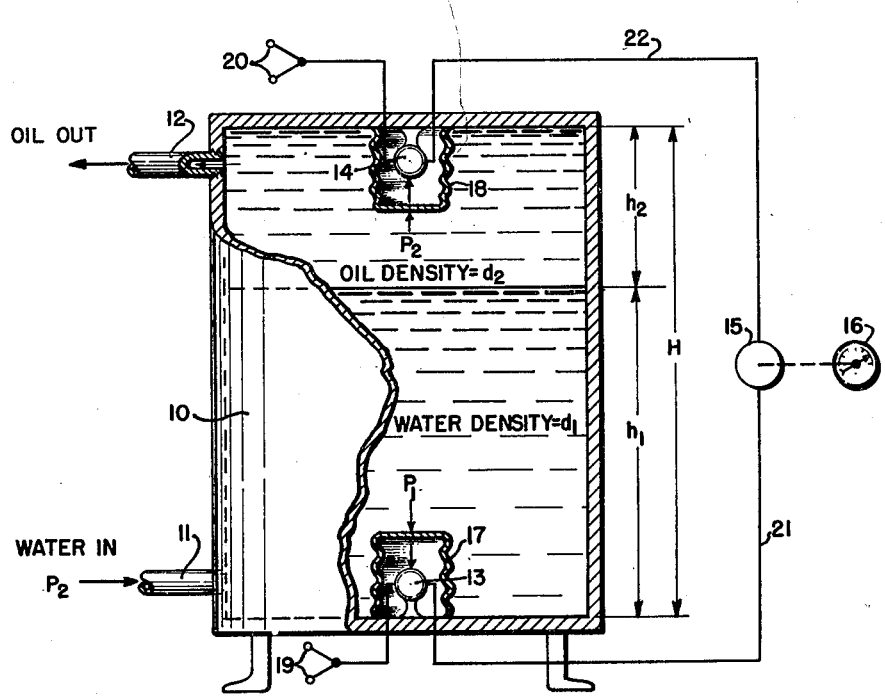
Fig. 1 is a cross-section of an oil tank showing the installation of one embodiment of the present invention.

Referring to Fig. 1, tank 10 is completely filled with two liquids, in the present illustration, oil and salt water. The water is pumped into the bottom of tank 10 through pipeline 11 under pressure head of P₂. The fuel oil emerges from pipeline 12 at the top of the tank to be fed to the fuel oil mains. The pressure, P₂ is of such magnitude that the tank is always completely filled, thus insuring that line 12 is always full.

The liquid level indicating apparatus generally includes two synchro generators 13 and 14, and a differential synchro generator 15 to which is attached a suitable indicator 16. The frame of synchro 13 is rigidly attached to the bottom of tank 10 and is hermetically sealed within Sylphon bellows 17. Changes of pressure within the tank cause upward and downward motion of the top surface of the bellows. This motion of this surface is transmitted to the rotor of synchro generator 13 by a rack and pinion, or other suitable device as will be more completely described in connection with Fig. 4. Synchro generator 14 is similarly enclosed within bellows 18. The rotors of synchros 13 and 14 are connected to a source of 115 volts, single phase, 60 cycle alternating voltage through terminals 19 and 20 respectively. The outputs of synchros 13 and 14 are applied to differential synchro generator 15 by cables 21 and 22, respectively.

The following mathematical discussion will clearly illustrate how a synchro system may be utilized to indicate the proportionate quantities of two liquids in a tank. The density of the salt water is designated as $d_1$, and the density of the oil is $d_2$, with $D=d_1-d_2=$difference in density of the two media. Further, the overall height of tank 10 is defined by H, and the proportionate height of water and oil in the tank are designated $h_1$ and $h_2$, respectively. Since the tank is always filled, $h_1+h_2=H$. The designation of $h_1$, as shown in Fig. 1, is not entirely correct, but since the bellows 17 is generally small compared to the height of the tank, $h_1$ can be considered as being measured from the bottom of the tank. As previously stated, the salt water enters under a pressure $P_2$, this pressure being transmitted throughout the liquid in tank 10. Since the bellows 18 is mounted at the top of the tank, the only pressure effective in causing deformation of the bellows is $P_2$. The pressure on bellows 17, however, is $P_2$ plus the pressure heads of the two liquids, or:

$$P_1 = h_1 d_1 + h_2 d_2 + P_2$$

But, $$h_1 = H - h_2, \text{ and } d_1 = D + d_2$$

Therefore, $$P_1 = (H-h_2)(D+d_2) + h_2 d_2 + P_2$$
$$= HD + Hd_2 - h_2 D + P_2$$

Thus, $$P_1 - P_2 = HD + Hd_2 - h_2 D$$

Upon examination of the latter formula, it will be noted that the differential of the pressures on bellows 17 and 18 is equal to a quantity which contains a single variable, namely, the height $h_2$, since H, D, and $d_2$ are all constants. Synchros 13 and 14 in combination with differential synchro 15 can be easily adapted to indicate this differential. Synchro 14 under control of bellows 18 transmits to differential synchro 15 information in regard to change in pressure $P_2$, whereas synchro 13 under action of bellows 17 transmits a signal to differential synchro 15 which also includes information concerning changes in $P_2$, but mainly indicates the changes in $h_2 D$. With proper calibration of the system, then, indicator 16 attached to the rotor shaft of differential synchro 15 can be graduated to read directly the height $(h_2)$ of oil in the tank. To further refine the system, $h_2$ can be calculated in terms of gallons, whereby indicator 16 indicates continuously, by gallons, the quantity of oil in tank 10.

It is obvious from the mathematics as hereinabove set forth, that should an indication of the quantity of the denser of the two liquids be desired, the system can be similarly calibrated to indicate changes in height of $h_1$.

Figure 2:
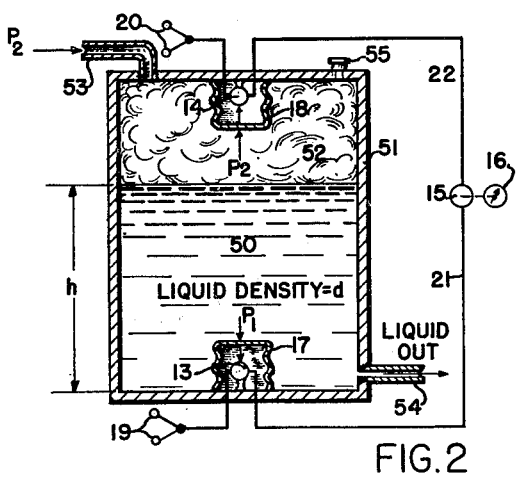
Fig. 2 is a cross-section of a tank showing an installation of the present invention for indicating the level of a single liquid under gaseous pressure.

A system similar to that described above which can be utilized to indicate the level of a single liquid under gaseous pressure in a closed tank, is illustrated in Fig. 2. Liquid 50 of density $d$, contained in closed tank 51, to a level $h$, is subjected to a variable pressure $P_2$ by gas 52 above the liquid. Gas is admitted to tank 51 by inlet pipe 53 and liquid is carried from the tank by pipeline 54. Provision for filling the tank with liquid is afforded by standpipe 55. The pressure $P_1$ exerted on bellows 17 to actuate synchro generator 13 is equal to $P_2$ and $hd$, both terms of which may be variable. The pressure on bellows 18 which actuates synchro generator 14 is simply the variable pressure $P_2$. The differential between the two pressures, $P_1-P_2=hd$, is indicated by the position of the rotor of differential synchro generator 15 to which is attached a suitable indicator 16. Since the density, $d$, of the liquid 50 is constant, the system can be calibrated to read $h$ in feet or gallons. The system, because of the differential synchro, will indicate continuously the level of the liquid regardless of changes in the gas pressure, $P_2$.

Figure 3:
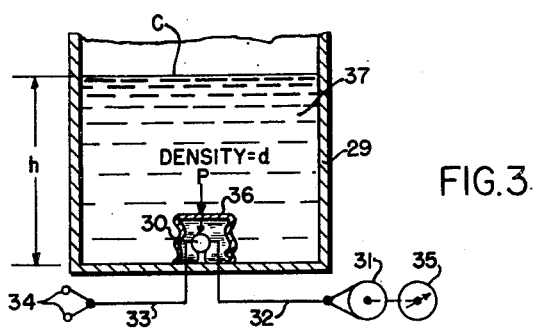
Fig. 3 is a cross-section of an oil tank showing the installation of the present invention for indicating the level of a single liquid under atmospheric pressure.

A second embodiment of the invention, providing apparatus for indicating the height of a single liquid held in an open tank 29 under atmospheric pressure C, is shown in Figure 3. In this case, since there is no differential of pressure to be indicated, a system including a single synchro generator 30 and a single synchro follower 31 is all that is required. The stator of generator 30 is connected to the follower by cable 32, and a single phase, alternating voltage is applied to the rotor by cable 33 through terminals 34. The shaft of follower 31 is coupled to a suitable indicator 35. Synchro generator 30 is hermetically sealed within Sylphon bellows 36, which is cooperatively attached to the synchro such that upward and downward movement of the bellows changes the position of the synchro rotor. As the height, $h$, of the liquid 37, having a density, $d$, changes, the pressure, $P=hd+C$, on the bellows changes resulting in a signal being transmitted to follower 31. Indicator 35, coupled to the rotor of the follower, is calibrated either in feet $(h)$ or directly in gallons.

Figure 4:
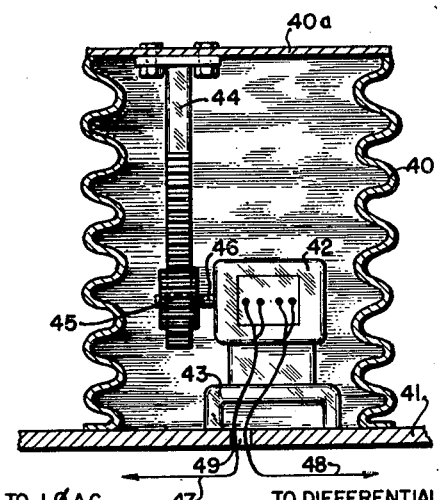
Fig. 4 is a cross-section of a bellows to illustrate how it actuates a synchro.

Referring now to Fig. 4, a method of transferring motion of the bellows to the synchro, as suggested in connection with Figs. 1 and 2, is clearly illustrated. Sylphon bellows 40 is hermetically sealed around its base to the bottom of a tank 41. Synchro generator 42 is rigidly mounted on supporting frame 43, which in turn is attached to the bottom of tank 41. Up and down motion of the top plate 40a of the bellows with changes in pressure upon it, is transmitted to the rotor of synchro 42 by a rack 44 and pinion 45 attached to the selsyn shaft 46. The position of the synchro rotor is thus a function of the deformation of bellows 40, the degree of deformation being dependent upon the force exerted upon the surface 40a. The rack 44 is of such length that through inadvertence or accident, the bellows cap 40a cannot be forced down to a point where it can damage synchro 42. The rotor and stator windings of synchro 42 are connected by cables 47 and 48 to a source of single phase alternating voltage, and a differential selsyn, respectively. Cables 47 and 48 are not exposed to the fluid in the tank since they pass out through a hole covered by the bellows. However, in the event of a leak in bellows 40, a liquid tight seal 49 is provided around cables 47 and 48, to prevent loss of liquid from the tank.

The foregoing discussion has described apparatus for continuously and remotely indicating the level of a liquid in a tank under various restraining conditions. It is not to be construed that the examples given are a definition of the invention, but merely illustrative of preferred forms the invention may take. It is intended that the spirit and scope of the invention be limited only by the appended claims.

The invention described herein may be manufactured and used by or for the Government of the United States of America for governmental purposes without the payment of any royalty thereon or therefor.

What is claimed is:

1. Apparatus for indicating the proportionate quantities of two liquids of different densities which completely fill a closed tank comprising first and second bellows being attached to the top and bottom, respectively, of said tank within said liquids, first and second synchro generators, said first synchro generator being disposed within and operable by said first bellows, said second synchro generator being disposed within and operable by said second bellows, a differential synchro generator, the output signals of said first and second synchro generators being applied to said differential synchro generator, and an indicator being mechanically coupled to said differential synchro generator.

2. Apparatus for indicating the proportionate quantities of two liquids of different densities which completely fill and are under external pressure within a closed tank comprising, first and second bellows, first and second synchro generators, said first bellows being attached to the bottom of said tank within said denser liquid, said first synchro generator being disposed within and in cooperative action with said first bellows, said second bellows being attached to the top of said tank within said less dense liquid, said second synchro generator being disposed within and in cooperative action with said second bellows, a differential synchro generator, said differential synchro generator being electrically coupled to said first and second synchro generators, and an indicator mechanically coupled to said differential synchro generator, said indicator being adapted to indicate the relative quantities of said denser and less dense liquids.

3. Apparatus for continuously indicating the quantity of the less dense of two immiscible liquids of different densities which completely fill and are under external pressure within a closed container comprising means positioned within said container for simultaneously and continuously measuring the pressure at the top and bottom of said container, means coupled to said pressure measuring means for continuously determining the difference in pressure between the top and bottom of said container, said difference in pressure being directly proportional to the height of said dense liquid in accordance with the formula: $P_1 - P_2 = HD + Hd_2 - h_2D$, where $P_1$ and $P_2$ are respectively the pressures at the bottom and top of said container, H is the height of said container, D is the difference in density of said two liquids, $d_2$ is the density of said less dense liquid, and $h_2$ is the height of said less dense liquid, and means coupled to said last-mentioned means calibrated continuously to indicate the volume of said less dense liquid.

4. Apparatus for indicating the proportionate quantities of two immiscible liquids of different densities which completely fill a closed tank comprising first and second synchro generators respectively mounted at the top and bottom of the tank within said liquids, first and second pressure responsive means respectively enclosing said first and second synchro generators and being respectively operatively coupled thereto, a differential synchro generator, the output signals of said first and second synchro generators being applied to said differential synchro generator, and an indicator mechanically coupled to said differential synchro generator.

5. Apparatus for continuously indicating the quantity of one of two immiscible fluids which completely fill and are under external pressure within a closed tank comprising, first and second flexible bellows each having a closed end and an open end, said first and second bellows being sealed at their open end to the top and bottom of said tank, respectively, and each disposed within one of said fluids, first and second synchro generators, said first synchro generator being secured to the top of said tank and disposed within said first bellows and said second synchro generator being secured to the bottom of said tank and disposed within said second bellows, a pinion secured to the shaft of each of said synchro generators, a rack secured internally the closed end of each of said bellows and engaging its corresponding pinion for actuating said synchro generators in response to changes in pressure on said bellows, a differential synchro generator located externally of said tank and electrically coupled to said first and second synchro generators, and an indicator mechanically coupled to said differential synchro generator arranged to indicate the quantity of said one fluid contained in said tank.

6. Apparatus for indicating the amount of liquid in a closed tank maintained under a variable gaseous pressure from an external source comprising, first and second bellows secured to the top and bottom of said tank within said gas and said liquid, respectively, first and second synchro generators disposed within said first and second bellows, respectively, said first synchro generator being operable by said first bellows to continuously generate an electrical signal representative of the magnitude of said gaseous pressure, said second synchro generator being operable by said second bellows to continuously generate an electrical signal representative of the sum of said variable gaseous pressure and the pressure exerted by virtue of the height of said liquid in said tank, a differential synchro generator located externally of said tank, means for coupling the signals from said first and second synchro generators to said differential synchro generator, the rotation of said differential synchro generator in response to said signals being proportional to the difference in pressure on said second and first bellows, and an indicator mechanically coupled to said differential synchro generator arranged to indicate the quantity of liquid in said tank.

7. Apparatus for indicating the proportionate amounts of oil and water which completely fill a closed tank which are maintained under variable pressure by water being pumped into said tank and displacing said oil, said appartus comprising, first and second bellows sealed to the top and bottom of said tank and positioned within said oil and said water, respectively, first and second synchro generators, said first synchro generator being disposed within and operable by said first bellows to continuously generate an electrical signal representative of said variable pressure, said second synchro generator being disposed within and operable by said second bellows to continuously generate a signal representative of the sum of said variable pressure and the pressure exerted on said second bellows by virtue of the heads of oil and water in said tank, a differential synchro generator coupled to said first and second synchro generators and responsive to said signals to produce a shaft rotation proportional to the head of oil in said tank, and an indicator mechanically coupled to said differential synchro generator calibrated to indicate the volume of oil in the tank.

8. In combination, a closed tank, first and second bellows respectively secured to the top and bottom of said tank internally thereof, first and second synchro generators, said first synchro generator being disposed within and operable by said first bellows, said second synchro generator being disposed within and operable by said second bellows, means for energizing said first and second synchro generators, a differential synchro generator located externally of said tank, the output signals of said first and second synchro generators being applied to said differential synchro generator, and an indicator mechanically coupled to said differential synchro generator, said indicator being constructed and arranged to indicate the quantity of one of two immiscible fluids of different densities which completely fill said tank.

JOHN ROWLAND McKNIGHT, Jr.

REFERENCES CITED

The following references are of record in the file of this patent:

UNITED STATES PATENTS

| Number | Name | Date |
| --- | --- | --- |
| 1,259,680 | Theobald | Mar. 19, 1918 |
| 2,419,087 | Peterson et al. | Apr. 15, 1947 |
| 2,441,869 | Childs | May 18, 1948 |

FOREIGN PATENTS

| Number | Country | Date |
| --- | --- | --- |
| 198,532 | Great Britain | June 7, 1923 |
| 28,305 | France | Feb. 16, 1925 |
| | (First Addition to No. 571,121) | |
| 252,177 | Italy | Feb. 26, 1927 |

OTHER REFERENCES

"Selsyns," a General Electric Co. publication of September 1930.

Certificate of Correction

April 22, 1952

Patent No. 2,593,473

JOHN ROWLAND McKNIGHT, Jr.

It is hereby certified that error appears in the printed specification of the above numbered patent requiring correction as follows:

Column 1, line 14, before "sufficiently" insert *of*; column 5, line 61, before "dense" insert *less*;

and that the said Letters Patent should be read as corrected above, so that the same may conform to the record of the case in the Patent Office.

Signed and sealed this 26th day of August, A. D. 1952.

[SEAL]

THOMAS F. MURPHY,
*Assistant Commissioner of Patents.*